(12) United States Patent
Nishide et al.

(10) Patent No.: US 9,356,292 B2
(45) Date of Patent: May 31, 2016

(54) RADICAL COMPOSITION AND BATTERY USING SAME

(75) Inventors: Hiroyuki Nishide, Tokyo (JP); Kenichi Oyaizu, Tokyo (JP); Sosuke Yamaguchi, Tokyo (JP); Nobutaka Fujimoto, Hyogo (JP); Yuji Kinpara, Hyogo (JP); Shun Hashimoto, Hyogo (JP); Shigeyuki Iwasa, Tokyo (JP); Kentaro Nakahara, Tokyo (JP)

(73) Assignees: SUMITOMO SEIKA CHEMICALS CO., LTD., Hyogo (JP); NEC CORPORATION, Tokyo (JP)

( * ) Notice: Subject to any disclaimer, the term of this patent is extended or adjusted under 35 U.S.C. 154(b) by 172 days.

(21) Appl. No.: 14/005,988

(22) PCT Filed: Mar. 23, 2012

(86) PCT No.: PCT/JP2012/057545
§ 371 (c)(1),
(2), (4) Date: Nov. 21, 2013

(87) PCT Pub. No.: WO2012/133202
PCT Pub. Date: Oct. 4, 2012

(65) Prior Publication Data
US 2014/0061532 A1   Mar. 6, 2014

(30) Foreign Application Priority Data
Mar. 31, 2011   (JP) ................ 2011-079885

(51) Int. Cl.
*H01M 4/60*     (2006.01)
*C08L 71/02*    (2006.01)
*H01M 10/052*   (2010.01)

(52) U.S. Cl.
CPC ............. *H01M 4/602* (2013.01); *C08L 71/02* (2013.01); *H01M 10/052* (2013.01)

(58) Field of Classification Search
None
See application file for complete search history.

(56) References Cited

U.S. PATENT DOCUMENTS

| 2006/0040182 | A1* | 2/2006 | Kawakami et al. ........ 429/218.1 |
| 2010/0129704 | A1* | 5/2010 | Luo .................... H01M 4/0404 |
| | | | 429/163 |
| 2011/0142787 | A1 | 6/2011 | Nagasaki et al. |
| 2012/0095179 | A1 | 4/2012 | Nishide et al. |

FOREIGN PATENT DOCUMENTS

| JP | 2008-78063 A | 4/2008 |
| JP | 2010-285408 | 12/2010 |
| WO | 2009/038125 | 3/2009 |
| WO | 2009/133647 | 11/2009 |
| WO | 2010/104002 | 9/2010 |

OTHER PUBLICATIONS

Oyaizu, et al., "Synthesis and Characterization of Radical-Bearing Polyethers as an Electrode-Active Material for Organic Secondary Batteries" Macromolecules, 2008, vol. 41, pp. 6646-6652.
Oyaizu, et al., "Synthesis and Charge Transport Properties of Redox-Active Nitroxide Polyethers with Large Site Density" Macromolecules, 2010, vol. 43, pp. 10382-10389.

* cited by examiner

*Primary Examiner* — Tanisha Diggs
(74) *Attorney, Agent, or Firm* — Hamre, Schumann, Mueller & Larson, P.C.

(57) ABSTRACT

The present invention provides a radical composition capable of suppressing elution of electrode components in an electrolyte solution when used in an electrode for a secondary battery, and a battery using the radical composition. The present invention relates to a radical composition including a pyrroline nitroxide polymer and polyethylene glycols.

2 Claims, 1 Drawing Sheet

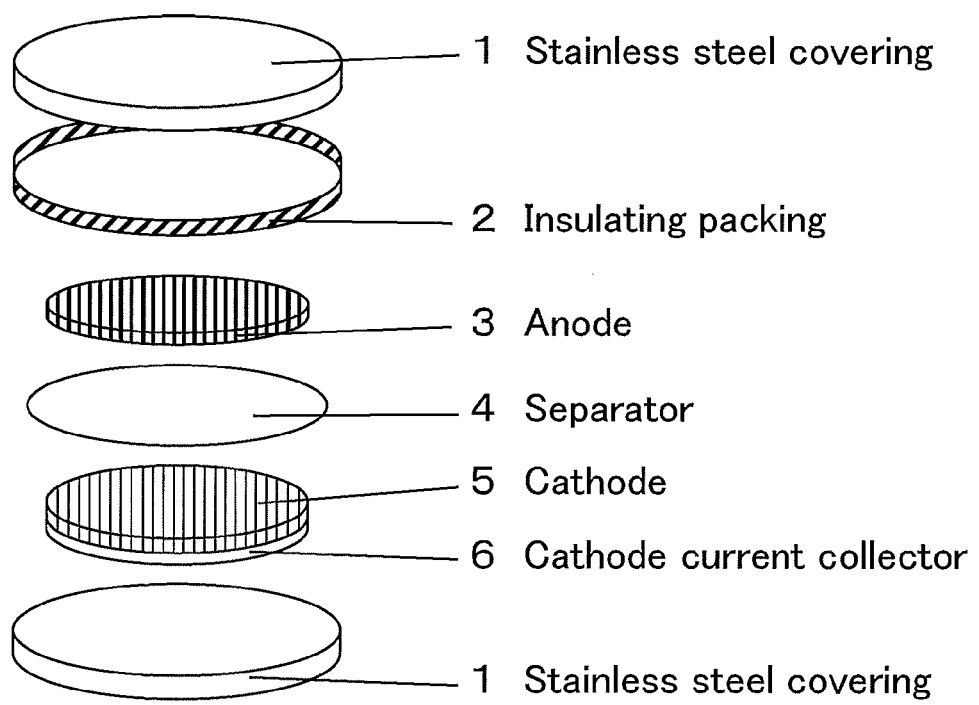

RADICAL COMPOSITION AND BATTERY USING SAME

TECHNICAL FIELD

The present invention relates to a radical composition and a battery using the radical composition.

BACKGROUND ART

Recently, mobile electronics such as laptop computers or cell phones are more and more sophisticated. Secondary batteries are expected to be used as the power sources for such mobile electronics because of their high energy density and long life.

Currently, widely used power sources for such mobile electronics are lithium ion secondary batteries in which a cathode is made from a lithium-containing transition metal compound and an anode is made from a lithium storage compound such as carbon materials.

The energy density of the lithium ion secondary batteries, however, is reaching to the theoretical limit, and therefore, development of novel secondary batteries that realize higher capacities is demanded. In addition, since lithium ion secondary batteries have a slow electrode reaction, application of a large current significantly lowers the battery performance. Moreover, lithium ion secondary batteries often fall below the expected capacity or output when being downsized, and need to be charged for a long period of time.

In order to solve such problems of secondary batteries, studies and development are actively made on secondary batteries including an organic radical compound (resin) as a reactant or product material of an electrode reaction.

A secondary battery using an organic radical compound as an electrode active material utilizes a redox reaction of radicals for charge and discharge, so that the reaction rate is fast. Accordingly, such a secondary battery has a high power output and is charged in a comparatively short time.

A polymeric compound having a pyrroline nitroxide structure is proposed as a radical compound used in such a secondary battery (see Patent Literatures 1 and 2). They teach that use of such a polymeric compound allows production of a secondary battery having high energy density and a large capacity.

CITATION LIST

Patent Literature

Patent Literature 1: WO 2009/038125
Patent Literature 2: WO 2010/104002

SUMMARY OF INVENTION

Technical Problem

However, when the polymeric compound having a pyrroline nitroxide structure disclosed in Patent Literatures 1 and 2 is used in an electrode for a secondary battery or the like, components of the electrode are problematically eluted in an electrolyte solution such as diethyl carbonate. The components eluted in the electrolyte solution cause clogging of a separator, and therefore, battery performance may be lowered for each charge and discharge cycle, possibly resulting in a significant damage in battery functions. In addition, a problem of capacity reduction after repetitive charge and discharge is still to be solved.

The present invention aims to provide a radical composition capable of suppressing elution of electrode components in an electrolyte solution when used in an electrode for a secondary battery, and a battery using the radical composition.

Solution to Problem

The present invention relates to:

1. a radical composition including a pyrroline nitroxide polymer and polyethylene glycols;

2. the radical composition according to 1, wherein the pyrroline nitroxide polymer is obtained by polymerization of a pyrroline nitroxide compound represented by the following formula (1):

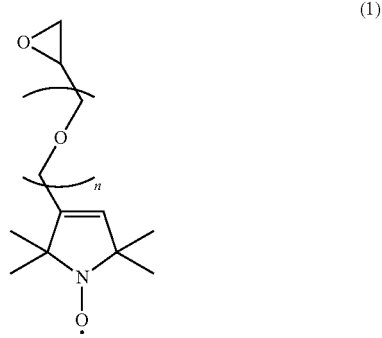

wherein n represents 0 or 1;

3. the radical composition according to 1, wherein the pyrroline nitroxide polymer is obtained by polymerization of a pyrroline nitroxide compound represented by the following formula (2):

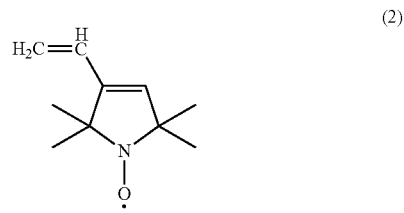

4. the radical composition according to 1, wherein the amount of the polyethylene glycols is 0.05 to 20 parts by mass relative to 100 parts by mass of the pyrroline nitroxide polymer; and 5. a battery including the radical composition according to 1, 2, 3, or 4.

The present invention is specifically described in the following.

The radical composition according to the present invention contains pyrroline nitroxide polymers.

The pyrroline nitroxide polymers are obtained by polymerization of a pyrroline nitroxide compound.

The pyrroline nitroxide polymers are preferably obtained by polymerization of a pyrroline nitroxide compound represented by the following formula (1).

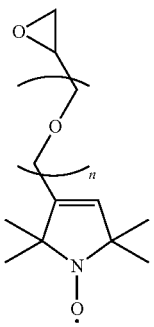

(1)

In the formula (1), n represents 0 or 1.

Examples of the pyrroline nitroxide compound represented by the formula (1) include 3-oxiranyl-2,2,5,5-tetramethyl pyrroline-1-oxyl wherein n in the formula (1) represents 0, and pyrroline nitroxide-substituted glycidyl ether wherein n in the formula (1) represents 1.

The 3-oxiranyl-2,2,5,5-tetramethyl pyrroline-1-oxyl is produced, for example, by a method (Tetrahedron Letters, 43(4), 553-555 (2002)) using 3-carbamoyl-2,2,5,5-tetramethyl pyrroline-1-oxyl as shown in the formulae (3).

Specifically, 3-carbamoyl-2,2,5,5-tetramethyl pyrroline-1-oxyl is hydrolyzed using a sodium hydroxide aqueous solution or the like to give 3-carboxy-2,2,5,5-tetramethyl pyrroline-1-oxyl. The 3-carboxy-2,2,5,5-tetramethyl pyrroline-1-oxyl is then reduced using lithium aluminum hydride-tert-butoxide or the like under an inert gas (e.g., argon gas, nitrogen gas) atmosphere to give 3-formyl-2,2,5,5-tetramethyl pyrroline-1-oxyl. The 3-formyl-2,2,5,5-tetramethyl pyrroline-1-oxyl is cyclized using trimethylsulfonium iodide to give 3-oxiranyl-2,2,5,5-tetramethyl pyrroline-1-oxyl.

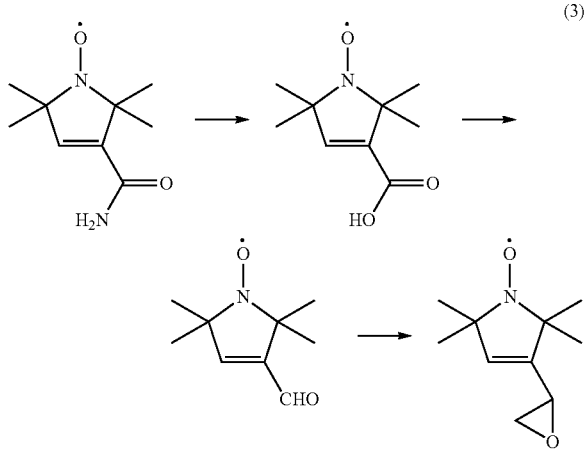

(3)

The pyrroline nitroxide-substituted glycidyl ether is produced, for example, by a method (Macromolecules, 26, 3227-3229 (1993)) in which epichlorohydrin and 4-hydroxy proxyl are reacted using tetrabutylammonium sodium hydrogen sulfate as a catalyst in the presence of sodium hydroxide.

Examples of the method of polymerizing a pyrroline nitroxide compound represented by the formula (1) for producing pyrroline nitroxide polymers include bulk polymerization and solution polymerization. Specifically, the bulk polymerization includes charging a predetermined amount of a nitroxide compound to a reactor equipped with a stirrer, a thermometer, a gas inlet tube for introducing inert gas such as argon gas or nitrogen gas, and a condenser tube, removing oxygen therein by inert gas, and adding a polymerization initiator with stirring. The solution polymerization includes, for example, charging an inert solvent, in addition to a predetermined amount of a nitroxide compound, in the same manner as in the bulk polymerization method, removing oxygen therein by inert gas, and adding a polymerization initiator with stirring.

The pyrroline nitroxide polymer is preferably obtained by polymerization of a pyrroline nitroxide compound represented by the formula (2).

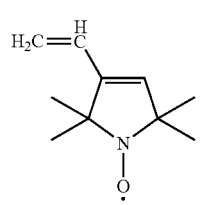

(2)

The pyrroline nitroxide compound represented by the formula (2) is produced, for example, by a method (CAN. J. CHEM., 64, 1482-1490 (1986)) using 3-carbamoyl-2,2,5,5-tetramethyl pyrroline-1-oxyl as shown in the formulae (4).

Specifically, 3-carbamoyl-2,2,5,5-tetramethyl pyrroline-1-oxyl is hydrolyzed using sodium hydroxide aqueous solution or the like to give 3-carboxy-2,2,5,5-tetramethyl pyrroline-1-oxyl. The 3-carboxy-2,2,5,5-tetramethyl pyrroline-1-oxyl is then reduced using lithium aluminum hydride-tert-butoxide or the like under an inert gas (e.g., argon gas, nitrogen gas) atmosphere to give 3-formyl-2,2,5,5-tetramethyl pyrroline-1-oxyl. The 3-formyl-2,2,5,5-tetramethyl pyrroline-1-oxyl is vinylated using methyl triphosphonium bromide or the like to give 3-vinyl-2,2,5,5-tetramethyl pyrroline-1-oxyl.

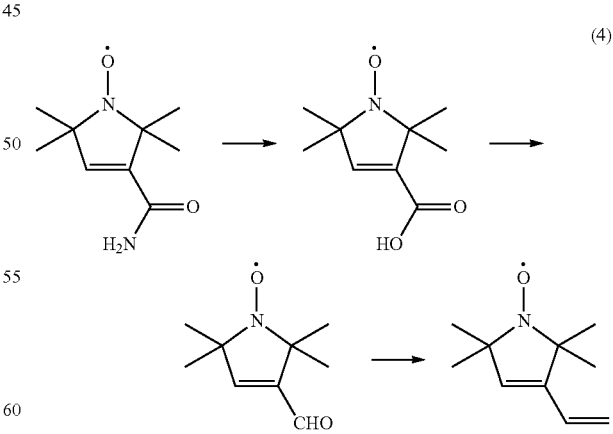

(4)

Examples of the method of polymerizing a pyrroline nitroxide compound represented by the formula (2) to produce pyrroline nitroxide polymers include bulk polymerization and solution polymerization. The bulk polymerization includes, for example, charging a predetermined amount of a nitorxide compound in a reactor equipped with a stirrer, a thermometer, a gas inlet tube for introducing inert gas such as argon gas or nitrogen gas, and a condenser tube, removing oxygen therein by inert gas, and adding a polymerization initiator with stirring. The solution polymerization include, for example, charging an inert solvent, in addition to a predetermined amount of a nitroxide compound, in the same manner as in the bulk polymerization method, removing oxygen therein by inert gas, and adding a polymerization initiator with stirring.

The pyrroline nitroxide polymer has a number average molecular weight of preferably 500 to 5,000,000, and more preferably 1,000 to 1,000,000. If the number average molecular weight is less than 500, the pyrroline nitroxide polymer may be dissolved in the electrolyte solution to reduce the capacity of the battery after repetitive use. If the number average molecular weight is more than 5,000,000, the solubility of the polymer in the solvent used in production of an electrode may be lowered, leading to poor handleability and reduction in capacity of the battery after repetitive use.

The number average molecular weight in the present invention is the molecular weight in terms of polystyrene having a known molecular weight obtained by converting the measured value by high performance liquid chromatography to the polystyrene equivalent value.

The pyrroline nitroxide polymer may be used solely, or two or more of them may be used in combination.

The radical composition according to the present invention contains polyethylene glycols. The polyethylene glycols are electrochemically stable resins. For example, when a filmed electrode is produced from a radical composition containing polyethylene glycols, polyethylene glycols are not agglomerated in a film, improving the dispersity of the electrode active material. Thus, a uniform film is produced.

Examples of the polyethylene glycols include polyethylene glycols and derivatives of these. Specifically, examples thereof include polyethylene glycol, sodium polyoxyethylene alkyl phenyl ether alkyl benzene sulfonate, sodium polyoxyethylene alkyl ether sulfate, sodium polyoxyethylene alkyl ether methyl carboxylate, sodium polyoxyethylene alkyl ether ethanesulfonate, polyoxyethylene alkyl ether, polyoxyethylene alkyl phenyl ether, polyoxyethylene fatty acid monoglyceride, polyoxyethylene sorbitol fatty acid partial ester, polyoxyethylene sorbitan fatty acid partial ester, polyoxyethylene lanolin alcohol ether, polyethylene glycol fatty acid monoester, polyethylene glycol fatty acid diester, polyoxyethylene aliphatic amine, polyoxyethylene polyoxypropylene block copolymers, polyoxyethylene polyoxypropylene alkyl ether, polyoxyethylene acetylene glycol, and polyethylene oxide.

Among the above exemplary polyethylene glycols, polyethylene glycol and polyethylene oxide are preferable, and polyethylene glycol is more preferable because they are readily available on the industrial scale at low cost and the obtainable effect is high.

Each of the polyethylene glycols may be used alone, or two or more of these may be used in combination.

Commonly, the polyethylene glycols have a number average molecular weight of preferably 500 to 500,000, and more preferably 1,000 to 50,000. If the number average molecular weight is less than 500, the compatibility with the pyrroline nitroxide polymers is poor. In such a case, the solubility of the pyrroline nitroxide polymers in the electrolyte solution is increased, so that the effect cannot be achieved sufficiently. If the number average molecular weight is more than 500,000, the miscibility with the pyrroline nitroxide polymers tends to be poor.

The number average molecular weight in the present invention is the molecular weight in terms of polystyrene having a known molecular weight obtained by converting the measured value by high performance liquid chromatography to the polystyrene equivalent value.

The amount of the polyethylene glycols may be appropriately adjusted in accordance with the molecular weight of the polyethylene glycols. The amount is preferably 0.05 to 20 parts by mass and more preferably 0.5 to 10 parts by mass relative to 100 parts by mass of the pyrroline nitroxide polymer. If the amount of the polyethylene glycols is less than 0.05 parts by mass, the effect of suppressing elution of the pyrroline nitroxide polymer in the electrolyte solution may be lowered. If the amount of the polyethylene glycols is more than 20 parts by mass, the effect fails to match the amount, which is not cost-effective. Moreover, an electrode produced from the radical composition according to the present invention may have high resistance.

The radical composition according to the present invention exerts an excellent effect especially when used as an electrode active material for batteries. Specifically, the radical composition according to the present invention is suitably used as a battery material when further containing other electrode active materials, conductivity imparting agents, binding agents, thickeners, catalysts and the like.

The radical composition according to the present invention may be produced by any method, and examples thereof include a method of dissolving pyrroline nitroxide polymers and polyethylene glycols using a solvent and mixing them by concentration and drying treatment.

A battery may be produced by using the radical composition according to the present invention as an electrode active material.

Such a battery is also one aspect of the present invention.

FIG. 1 shows one example of an embodiment of the battery according to the present invention. The battery illustrated in FIG. 1 has the following configuration. A cathode 5 and an anode 3 are stacked to face each other with a separator 4 that contains an electrolyte solution interposed therebetween, and a cathode current collector 6 is further stacked on the cathode 5. The stacked product is covered with a stainless steel covering 1 on the anode side and a stainless steel covering 1 on the cathode side. Between the coverings, an insulating packing 2 made of an insulating material (e.g., plastic resin) is positioned in order to avoid electrical contact between them. Main components constituting the battery are described in the following.

(1) Electrode Active Material

In the present invention, an "electrode active material" refers to a substance that directly contributes to an electrode reaction such as charge reactions or discharge reactions and is central to a battery system.

The electrode active material contains the radical composition according to the present invention. As the electrode active material for a cathode and/or an anode, the radical composition according to the present invention may be used solely, or combined with other electrode active material(s).

When the radical composition according to the present invention is used as the electrode active material for a cathode, examples of the other electrode active material(s) include metal oxides, disulfide compounds, other stable radical compounds, and conductive polymers.

Examples of the metal oxides include: lithium manganate such as $LiMnO_2$, and lithium manganate having a spinel structure such as or $Li_xMn_2O_4$ ($0<x<2$); $MnO_2$, $LiCoO_2$, $LiNiO_2$, or $Li_yV_2O_5$ ($0<y<2$); $LiFePO_4$ (olivine material); materials in which a part of Mn in the spinel structure is substituted with another transition metal, such as $LiNi_{0.5}Mn_{1.5}O_4$, $LiCr_{0.5}Mn_{1.5}O_4$, $LiCo_{0.5}Mn_{1.5}O_4$, $LiCoMnO_4$, $LiNi_{0.5}Mn_{0.5}O_2$, $LiNi_{0.33}Mn_{0.33}Co_{0.33}O_2$, $LiNi_{0.8}Co_{0.2}O_2$, or $LiNi_{0.5}Mn_{1.5-z}Ti_zO_4$ ($0<z<1.5$).

Examples of the disulfide compounds include dithioglycol, 2,5-dimercapto-1,3,4-thiadiazole, and S-triazine-2,4,6-trithiole.

Examples of the other stable radical compounds include poly(2,2,6,6-tetramethyl-4-piperidinoxymethacrylate).

Examples of the conductive polymers include polyacetylene, polyphenylene, polyaniline, or polypyrrole.

Among these, lithium manganate and $LiCoO_2$ are preferable.

When the radical composition according to the present invention is used as an electrode active material for an anode, examples of the other electrode active material(s) include graphite, amorphous carbon, metallic lithium, lithium alloy, lithium ion storage carbon, metallic sodium, other stable radical compounds, and conductive polymers.

Examples of the other stable radical compounds include poly(2,2,6,6-tetramethyl-4-piperidinoxymethacrylate).

Among these, use of the radical compound in combination with metallic lithium or graphite is preferable. The forms thereof are not particularly limited, and exemplary forms include film, bulk, compressed powder, fibrous, and flaky forms.

In the present invention, from the standpoint of energy density, the electrode active material containing the radical composition according to the present invention is preferably used as an electrode active material for a cathode. More preferably, the radical composition according to the present invention is used solely without combined with the other electrode active material(s). In this case, the electrode active material for an anode is preferably metallic lithium or graphite.

(2) Conductivity Imparting Agent (Conduction Aid) and Ionic Conduction Aid

When the radical composition according to the present invention is used as an electrode active material, a conductivity imparting agent (conduction aid) and/or an ionic conduction aid may be mixed therein with an aim of lowering the impedance and improving the energy density and output performance.

Examples of the conduction aid include: carbonaceous fine particles such as graphite, carbon black, or acetylene black; carbon fibers such as vapor-grown carbon fiber (VGCF) or carbon nanotube; and conductive polymers such as polyaniline, polypyrrole, polythiophene, polyacetylene, or polyacene.

Examples of the ionic conduction aid include polymer gel electrolytes and polymer solid electrolytes. Among these, carbon fibers are suitably used, and vapor-grown carbon fiber is more suitably used. Use of carbon fiber increases the tensile strength of the electrode, so that the electrode is less likely to be cracked or peeled. Each of these conduction aids and ionic conduction aids may be used alone, or two or more of these may be used in combination.

In the case that the conduction aid and/or the ionic conduction aid are used, the proportion thereof in the electrode is preferably 10 to 80% by mass.

(3) Binding Agent

The electrode active material may be blended with a binding agent for stronger binding of components.

Examples of the binding agent include resin binders such as polytetrafluoroethylene, polyvinylidene fluoride, vinylidenefluoride-hexafluoropropylene copolymers, vinylidenefluoride-tetrafluoroethylene copolymers, styrene-buradiene copolymer rubber, polypropylene, polyethylene, polyimide, or various polyurethanes. Each of these binding agents may be used alone, or two or more of these may be used in combination.

In the case that the binding agent is used, the proportion thereof in the electrode is preferably 5 to 30% by mass.

(4) Thickener

A thickener may be added for facilitating preparation of a slurry for producing the electrode active material.

Examples of the thickener include carboxymethyl cellulose, polypropylene oxide, hydroxyethyl cellulose, hydroxypropyl cellulose, carboxymethyl hydroxyethyl cellulose, polyvinyl alcohol, polyacrylamide, hydroxyethyl polyacrylate, ammonium polyacrylate, and sodium polyacrylate. Each of these thickeners may be used alone, or two or more of these may be used in combination.

When the thickener is used, the proportion thereof in the electrode is preferably 0.1 to 5% by mass.

(5) Catalyst

The electrode active material may contain a catalyst that facilitates a redox reaction for a smoother electrode reaction.

Examples of the catalyst include: conductive polymers such as polyaniline, polypyrrole, polythiophene, polyacetylene, or polyacene; basic compounds such as pyridine derivatives, pyrrolidone derivatives, benzimidazole derivatives, benzothiozole derivatives, or acridine derivatives; and metallic ion complexes. Each of these catalysts may be used alone, or two or more of these may be used in combination.

When the catalyst is used, the proportion thereof in the electrode is preferably 10% by mass or less.

(6) Current Collector and Separator

Examples of the current collector used in contact with the electrode active material include nickel, aluminum, copper, gold, silver, aluminum alloy, stainless steel, and carbon. The current collector may have a foil, metallic flat plate, or mesh shape. The current collector may have a catalytic effect, or chemically bound to the electrode active material.

Examples of the separator include porous films made from polyethylene or polypropylene, and nonwoven fabric.

(7) Electrolyte

In the battery according to the present invention, the electrolyte transports charge carriers between the anode and the cathode, and commonly has an ion conductivity of preferably $10^{-5}$ to $10^{-1}$S/cm at 20° C. The electrolyte may be, for example, an electrolyte solution prepared by dissolving an electrolyte salt in a solvent.

Examples of the electrolyte salt include conventionally known materials such as $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$, or $Li(C_2F_5SO_2)_3C$. Each of these electrolyte salts may be used alone, or two or more of these may be used in combination.

Examples of the solvent include organic solvents such as ethylene carbonate, propylene carbonate, dimethyl carbonate, diethyl carbonate, methyl ethyl carbonate, γ-butyrolactone, tetrahydrofuran, dioxolan, sulfolane, N,N-dimethylformamide, N,N-dimethylacetamide, or N-methyl-2-pyrrolidone. Each of these solvents may be used alone, or two or more of these may be used in combination.

Also usable as the electrolyte are a solid electrolyte including a polymer compound containing the electrolyte salt, and a solid electrolyte including a gelled polymer compound containing the electrolyte solution.

Examples of the polymer compound include: vinylidene fluoride polymers such as polyvinylidene fluoride, vinylidene fluoride-hexafluoropropylene copolymers, vinylidene fluoride-ethylene copolymers, vinylidene fluoride-monofluoroethylene copolymers, vinylidene fluoride-trifluoroethylene copolymers, vinylidene fluoride-tetrafluoroethylene copolymers, or vinylidene fluoride-hexafluoropropylene-tetrafluoroethylene ternary copolymers; acrylonitrile copolymers such as acrylonitrile-methyl methacrylate copolymers, acrylonitrile-methylacrylate copolymers, acrylonitrile-ethylmethacrylate copolymers, acrylonitrile-ethylacrylate copolymers, acrylonitrile-methacrylic acid copolymers, acrylonitrile-acrylic acid copolymers, or acrylonitrile-vinyl acetate copolymers; and polyethylene oxide, ethylene oxide-propylene oxide copolymers, and polymers of acrylates or methacrylates thereof.

(8) Battery Shape

The shape of the battery according to the present invention is not particularly limited, and a conventionally known shape may be employed. Exemplary batteries include a battery constituted by an electrode stack or rolled electrode which is sealed in a metal- or resin covering or sealed with a laminate film made of a synthetic resin film and a metal foil such as an aluminum foil. The shape thereof may be a cylinder, square, coin, sheet, or the like.

(9) Method of Producing Battery

A method of producing the battery according to the present invention is not particularly limited, and a proper method in accordance with the material may be employed. Exemplary method includes the steps of preparing a slurry by adding a solvent to a conductivity imparting agent and the electrode active material containing the radical composition according to the present invention, or the like, applying the slurry to electrode current collectors, volatilizing the solvent by heating or at ambient temperatures to produce electrodes, polarizing the obtained electrodes to have opposite polarities, stacking or rolling the electrodes with an separator interposed therebetween, wrapping the stack or roll with a covering material, injecting an electrolyte solution thereto, and sealing it. Examples of the solvent used for slurrying include: ether solvents such as tetrahydrofuran, diethyl ether, ethylene glycol dimethyl ether, or dioxane; amine solvents such as N,N-dimethylformamide or N-methyl-2-pyrrolidone; aromatic hydrocarbon solvents such as benzene, toluene, or xylene;

aliphatic hydrocarbon solvents such as hexane or heptane; halogenated hydrocarbon solvents such as chloroform, dichloromethane, dichloroethane, trichloroethane, or carbon tetrachloride; alkyl ketone solvents such as acetone or methyl ethyl ketone; alcohol solvents such as methanol, ethanol, or isopropyl alcohol; dimethyl sulfoxide; and water. Another method for producing electrodes includes the steps of: dry-mixing an electrode active material, a conductivity imparting agent, and the like; and forming the resulting material into a thin film; and stacking the film on an electrode current collector.

Advantageous Effects of Invention

The present invention provides a radical composition capable of suppressing elution of electrode components in an electrolyte solution when used in an electrode for a secondary battery, and a battery using the radical composition.

Though the mechanism of the suppression is not clear, it is presumably based on the compatibility between pyrroline nitroxide polymers and polyethylene glycols.

BRIEF DESCRIPTION OF DRAWINGS

FIG. 1 is a schematic view illustrating one example of an embodiment of a battery according to the present invention.

DESCRIPTION OF EMBODIMENTS

The present invention is specifically described with reference to preparations and examples. The present invention is not limited to these preparations and examples.

Preparation 1

(Preparation of Pyrroline Nitroxide Compound)

A 100-mL four-neck flask equipped with a stirrer, a thermometer, a reflux condenser tube, and a flow meter was charged with 1.17 g of 3-carbamoyl-2,2,5,5-tetramethylpyrroline-1-oxyl and 16.8 mL of a 10 wt % aqueous sodium hydroxide solution. The mixture was suspended and allowed to stand for two hours at 100° C. Then, an appropriate amount of dilute hydrochloric acid was added thereto to neutralize the mixture. In this manner, a yellow solution was obtained. To the solution, 50 mL of diethyl ether was added, and the target substance was extracted from the solution by the ether. The ether was concentrated to give 1.12 g of 3-carboxy-2,2,5,5-tetramethylpyrroline-1-oxyl in the form of yellow crystals.

Because of the following properties, the obtained 3-carboxy-2,2,5,5-tetramethylpyrroline-1-oxyl could be identified.

IR (KBr): 3300, 2500, 1707 $cm^{-1}$

Molecular mass (Mass analysis by atmospheric pressure ionization method): 184

An amount of 1 g of the obtained 3-carboxy-2,2,5,5-tetramethylpyrroline-1-oxyl was fed into a 100-mL four-neck flask equipped with a stirrer, an argon-gas inlet tube, a thermometer, and a reflux condenser tube. Here, the flask was preliminary purged with argon gas. A mixed solvent containing 12 mL of benzene and 0.44 mL of pyridine was added thereto to dissolve the 3-carboxy-2,2,5,5-tetramethylpyrroline-1-oxyl.

Next, the solution was cooled to 5° C. under argon atmosphere, and 0.44 mL of thionyl chloride dissolved in 2 mL of benzene were added thereto. After stirring for one hour, the solvent was removed and 10 mL of THF was added thereto to dissolve residues.

Then, the solution was cooled to −78° C., and 10 mL of 1 mol/L lithium aluminum hydride-tert-butoxide THF solution was dropped thereto over two hours.

The target substance was extracted from the solution by 50 mL of ethyl acetate. The ethyl acetate was subsequently concentrated to give 0.44 g of 3-formyl-2,2,5,5-tetramethylpyrroline-1-oxyl in the form of yellow crystals.

Because of the following properties, the obtained 3-formyl-2,2,5,5-tetramethylpyrroline-1-oxyl could be identified.

IR (KBr): 2834, 2736, 1688 $cm^{-1}$

Molecular mass (Mass analysis by atmospheric pressure ionization method): 168

A 100-mL four-neck flask equipped with a stirrer, an argon gas inlet tube, a thermometer, and a reflux condenser tube was charged with 125 mg of sodium hydride and 2 mL of dimethyl sulfoxide. Here, the flask was preliminary purged with argon gas. The mixture was stirred for one hour at 65° C.

Then, 2.5 mL of THF was added thereto, and the solution was cooled to −10° C. in a salt/ice bath. At that temperature, 0.64 g of trimethylsulfonium iodide and 2.5 mL of a dimethyl sulfoxide solution were added, and the mixture was stirred for five minutes.

To the solution, 0.44 g of the 3-formyl-2,2,5,5-tetramethyl pyrroline-1-oxyl dissolved in 1 mL of THF was dropped at −10° C. over 30 minutes, and the mixture was stirred for two hours at ambient temperatures.

The target substance was extracted from the solution by 50 mL of ethyl acetate. The ethyl acetate was subsequently concentrated to give 0.34 g of 3-oxiranyl-2,2,5,5-tetramethyl pyrroline-1-oxyl that is a compound represented by the formula (1) in which n represents 0, in the form of orange liquid.

Because of the following properties, the obtained 3-oxiranyl-2,2,5,5-tetramethyl pyrroline-1-oxyl could be identified.

$^1$H NMR (CDCl$_3$): 5.49, 3.27, 2.93, 2.64, 1.35, 1.30, 1.24, 1.22 ppm $^{13}$C NMR (CDCl$_3$): 142.0, 129.0, 70.2, 68.0, 49.2, 47.5, 25.7, 25.2, 25.0, 24.4 ppm IR (KBr): 1249, 932, 846 cm$^{-1}$ Molecular mass (Mass analysis by atmospheric pressure ionization method): 182

(Preparation of Pyrroline Nitroxide Polymer)

A 5-mL four-neck flask equipped with a stirrer, an argon-gas inlet tube, a thermometer, and a reflux condenser tube was charged with 2 mL of a 1 mol/L diethyl zinc (0.25 g of diethyl zinc) solution in hexane. Here, the flask was preliminary purged with argon gas. The solution was cooled to −78° C., and 36 μL of water was added thereto. The solution was warmed to ambient temperatures and reacted for one hour to give a diethyl zinc/aqueous initiator as a polymerization initiator, in the form of yellow liquid.

Next, a 5-mL four-neck flask equipped with a stirrer, an argon-gas inlet tube, a thermometer, and a reflux condenser tube was charged with 0.18 g (1 mmol) of 3-oxiranyl-2,2,5,5-tetramethyl pyrroline-1-oxyl that is obtained in the same manner as in preparation of the pyrroline nitroxide compound. Here, the flask was preliminary purged with argon gas. After addition of 0.2 mL of the diethyl zinc/aqueous initiator, the mixture was polymerized for 48 hours at ambient temperatures under argon atmosphere. Then, an appropriate amount of methanol was added to stop the reaction. The reaction liquid was added to 50 mL of hexane and filtered to give a fraction. The fraction was washed with 10 mL of hexane and dried under reduced pressure, thereby giving 0.03 g of pyrroline nitroxide polymers in the form of orange solids (yield of 15%).

The measured number average molecular weight of the resulting pyrroline nitroxide polymers was 180,000. The number average molecular weight was measured in N,N-dimethylformamide containing LiBr (0.01 mol/L) at 30° C. by gel permeation chromatography (product of TOSOH CORPORATION, trade name: HLC-8020) and determined based on the standard polystyrene.

Preparation 2

(Preparation of Pyrroline Nitroxide Compound)

A 100-mL four-neck flask equipped with a stirrer, a thermometer, a reflux condenser tube, and a flow meter was charged with 1.17 g of 3-carbamoyl-2,2,5,5-tetramethyl pyrroline-1-oxyl and 16.8 mL of a 10 wt % sodium hydroxide aqueous solution. The mixture was suspended and allowed to stand for two hours at 100° C. Then, an appropriate amount of dilute hydrochloric acid was added thereto to neutralize the mixture. In this manner, a yellow solution was obtained. To the solution, 50 mL of diethyl ether was added, and the target substance was extracted from the solution by the diethyl ether. The diethyl ether was concentrated to give 1.12 g of 3-carboxy-2,2,5,5-tetramethylpyrroline-1-oxyl in the form of yellow crystals.

Because of the following properties, the obtained 3-carboxy-2,2,5,5-tetramethylpyrroline-1-oxyl could be identified.

IR(KBr): 3300, 2500, 1707 cm$^{-1}$

Molecular mass (Mass analysis by atmospheric pressure ionization method): 184

An amount of 1 g of the obtained 3-carboxy-2,2,5,5-tetramethylpyrroline-1-oxyl was fed into a 100-mL four-neck flask equipped with a stirrer, an argon-gas inlet tube, and a thermometer. Here, the flask was preliminary purged with argon gas. A mixed solvent containing 12 mL of benzene and 0.44 mL of pyridine was added thereto to dissolve the 3-carboxy-2,2,5,5-tetramethylpyrroline-1-oxyl.

Next, the solution was cooled to 5° C. under argon atmosphere, and 0.44 mL of thionyl chloride and 2 mL of benzene were added thereto. After stirring for one hour, the solvent was removed and 10 mL of THF was added thereto to dissolve residues. Then, the solution was cooled to −78° C., and 5.4 mL of 1 mol/L lithium aluminum hydride-tert-butoxide THF solution was dropped thereto at that temperature over two hours. The target substance was extracted from the solution by 50 mL of ethyl acetate. The ethyl acetate was subsequently concentrated to give 0.44 g of 3-formyl-2,2,5,5-tetramethylpyrroline-1-oxyl in the form of yellow crystals.

Because of the following properties, the obtained 3-formyl-2,2,5,5-tetramethylpyrroline-1-oxyl could be identified.

IR (KBr): 2834, 2736, 1688 cm$^{-1}$

Molecular mass (Mass analysis by atmospheric pressure ionization method): 168

Next, a 100-mL four-neck flask equipped with a stirrer, an argon-gas inlet tube, and a thermometer was charged with 3.19 g of methyl triphosphonium bromide, 1.36 g of potassium carbonate, and 8.4 mL of tetrahydrofuran at 0° C. The mixture was dissolved and allowed to stand for 30 minutes at that temperature. Here, the flask was preliminary purged with argon gas. Then, 0.50 g of 3-formyl-2,2,5,5-tetramethylpyrroline-1-oxyl dissolved in 2.3 mL of tetrahydrofuran were added. The mixture was stirred at 25° C. for 48 hours. The target substance was extracted from the solution by 50 mL of diethyl ether. The diethyl ether was subsequently concentrated to give 0.23 g of 3-vinyl-2,2,5,5-tetramethylpyrroline-1-oxyl represented by the formula (2) in the form of orange liquid.

Because of the following properties, the obtained 3-vinyl-2,2,5,5-tetramethylpyrroline-1-oxyl could be identified.

$^1$H NMR (CDCl$_3$): 6.16, 5.60, 5.41, 5.11, 1.39, 1.25 ppm $^{13}$C NMR (CDCl$_3$): 131.3, 130.2, 115.1, 113.7, 69.8, 67.3, 25.3, 24.6 ppm IR (KBr): 2974, 1635, 1593 cm$^{-1}$ Molecular mass (Mass analysis by atmospheric pressure ionization method): 166

(Preparation of Pyrroline Nitroxide Polymer)

A 5-mL egg-plant shaped flask equipped with a stirrer and an argon gas inlet tube was charged with 0.17 g (1 mmol) of 3-vinyl-2,2,5,5-tetramethylpyrroline-1-oxyl obtained in the same manner as in preparation of the pyrroline nitroxide compound. Oxygen in the reaction system was replaced with argon gas while the temperature of the system was kept at 25° C. Next, polymerization initiators including 0.13 mg (0.0006 mmol) of cyclopentadienyltitanium (IV) trichloride and 11.25 mg (0.194 mmol) of methylaluminoxane were added, and the compound was polymerized with stirring at 25° C. for 22 hours under argon atmosphere. Then, an appropriate amount of methanol was added to stop the reaction. The reaction liquid was added to 50 mL of hexane and filtered to give a fraction. The fraction was washed with 10 mL of hexane and dried under reduced pressure, thereby giving 0.02 g of light-brown pyrroline nitroxide polymers (yield of 11%).

The measured number average molecular weight of the resulting pyrroline nitroxide polymers was 26,000. The number average molecular weight was measured in N,N-dimethylformamide containing LiBr (0.01 mol/L) at 30° C. with use of gel permeation chromatography (product of Shimadzu Corporation) and determined based on the standard polystyrene.

Example 1

An amount of 9.0 g of N-methyl-2-pyrrolidinone (NMP) was added to 1.0 g of polyvinylidene fluoride, and the polyvinylidene fluoride was dissolved to give a polyvinylidene fluoride solution.
To the solution, 0.3 g of pyrroline nitroxide polymers prepared in the same manner as in Preparation 1 and 0.015 g of polyethylene glycol (product of Sigma-Aldrich Japan, number average molecular weight of 35,000) were added. The mixture was stirred with a stirrer until uniform to give a radical composition.
To the obtained radical composition, 3.0 g of NMP and 3.0 g of the polyvinylidene fluoride solution were added. The mixture was stirred with a stirrer until uniform to give a nitroxide polymer dispersion.
To the obtained nitroxide polymer dispersion, 2.4 g of graphite powder was added as a conduction aid. The mixture was stirred with a stirrer until uniform to prepare ink for an electrode.
The obtained ink for an electrode was casted on an ITO/glass electrode substrate, and dried at 120° C. under reduced pressure for one hour, thereby removing the solvent to form a film on the electrode. In this manner, a filmed electrode was produced.

Example 2

A radical composition and a filmed electrode were produced in the same manner as in Example 1, except that 0.0015 g of polyethylene glycol was used instead of 0.015 g of polyethylene glycol.

Example 3

A radical composition and a filmed electrode were produced in the same manner as in Example 1, except that 0.030 g of polyethylene glycol was used instead of 0.015 g of polyethylene glycol.

Example 4

A radical composition and a filmed electrode were produced in the same manner as in Example 1, except that 0.090 g of polyethylene glycol was used instead of 0.015 g of polyethylene glycol.

Example 5

A radical composition and a filmed electrode were produced in the same manner as in Example 1, except that 0.015 g of polyethylene glycol (product of Sigma-Aldrich Japan, number average molecular weight of 570 to 630) was used instead of 0.015 g of polyethylene glycol (product of Sigma-Aldrich Japan, number average molecular weight of 35,000).

Example 6

A radical composition and a filmed electrode were produced in the same manner as in Example 1, except that 0.015 g of polyethylene glycol (product of Sigma-Aldrich Japan, number average molecular weight of 400,000) was used instead of 0.015 g of polyethylene glycol (product of Sigma-Aldrich Japan, number average molecular weight of 35,000).

Example 7

A radical composition and a filmed electrode were produced in the same manner as in Example 1, except that 0.015 g of polyethylene glycol (product of Sigma-Aldrich Japan, number average molecular weight of 285 to 315) was used instead of 0.015 g of polyethylene glycol (product of Sigma-Aldrich Japan, number average molecular weight of 35,000).

Example 8

A radical composition and a filmed electrode were produced in the same manner as in Example 1, except that 0.015 g of polyethylene glycol (product of Sigma-Aldrich Japan, number average molecular weight of 900,000) was used instead of 0.015 g of polyethylene glycol (product of Sigma-Aldrich Japan, number average molecular weight of 35,000).

Example 9

A radical composition and a filmed electrode were produced in the same manner as in Example 1, except that 0.3 g of pyrroline nitroxide polymers obtained in the same manner as in Preparation 2 was used instead of 0.3 g of the pyrroline nitroxide polymers obtained in the same manner as in Preparation 1.

Comparative Example 1

A radical composition and a filmed electrode were produced in the same manner as in Example 1, except that polyethylene glycol was not added.
(Evaluation)
(1) State of Film
The state of the film formed on the electrode of each of the filmed electrodes obtained in the examples and the comparative examples was observed using a scanning electron microscope (product of JEOL Ltd., product name: JSM-6390LA Analytical Scanning Electron Microscope).
The observation showed that, in the case of using the nitroxide polymer dispersions obtained in Examples 1 to 3, 5 to 7, and 9, uniform films were formed.
In the case of using the nitroxide polymer dispersions obtained in Examples 4 and 8, formed films were almost uniform but had a very small portion of agglomeration.
In contrast, in the case of using the nitroxide polymer dispersion obtained in Comparative Example 1, the graphite powder was partially agglomerated.
(2) Measurement of CV Curve
The filmed electrodes obtained in the examples and comparative examples were each measured for a CV curve at a scanning rate of 20 mV/s and a temperature of 25° C. using an electrochemical analyzer (product of BAS Inc., trade name: ALS 600B electrochemical analyzer), where, in acetonitrile, tetrabutylammonium perchlorate was an electrolyte substrate (0.1 mol/L) and the reference electrode was Ag/AgCl.
In the case of using the nitroxide polymer dispersion obtained in Example 1, a redox wave derived from the pyrroline nitroxide polymer appeared at 0.88 V, and no change was observed in the redox wave even after sweeping for 1000 times.
Also, in the cases of using the nitroxide polymer dispersions obtained in Examples 2, 3, 5, 6, and 9, no change was found in the redox waves even after sweeping for 1000 times.
In the case of using the nitroxide polymer dispersions obtained in Examples 4, 7, and 8, the redox waves were observed even after sweeping for 1000 times but were slightly smaller than those of Examples 1 to 3, 5, 6, and 9.
In contrast, in the case of using the nitroxide polymer dispersion obtained in Comparative Example 1, the redox wave was not observed after sweeping for 1000 times.
The cause of this phenomenon was presumably elution of the nitroxide polymers in the electrolyte solution.

TABLE 1

| | Radical polymer | | Polyethylene glycols | | Proportion of polyethylene glycols* | Evaluation | |
|---|---|---|---|---|---|---|---|
| | Kind | Amount (g) | Number average molecular weight | Amount (g) | (parts by mass) | State of film | CV curve |
| Example 1 | Preparation 1 | 0.3 | 35,000 | 0.015 | 5 | Uniform | No change in redox wave |
| Example 2 | Preparation 1 | 0.3 | 35,000 | 0.0015 | 0.5 | Uniform | No change in redox wave |
| Example 3 | Preparation 1 | 0.3 | 35,000 | 0.03 | 10 | Uniform | No change in redox wave |
| Example 4 | Preparation 1 | 0.3 | 35,000 | 0.09 | 30 | A small portion of polyethylene glycols was agglomerated | Redox wave was slightly smaller |
| Example 5 | Preparation 1 | 0.3 | 570-630 | 0.015 | 5 | Uniform | No change in redox wave |
| Example 6 | Preparation 1 | 0.3 | 400,000 | 0.015 | 5 | Uniform | No change in redox wave |
| Example 7 | Preparation 1 | 0.3 | 285-315 | 0.015 | 5 | Uniform | Redox wave was slightly smaller |
| Example 8 | Preparation 1 | 0.3 | 900,000 | 0.015 | 5 | A small portion of polyethylene glycols was agglomerated | Redox wave was slightly smaller |
| Example 9 | Preparation 2 | 0.3 | 35,000 | 0.015 | 5 | Uniform | No change in redox wave |
| Comparative Example 1 | Preparation 1 | 0.3 | — | — | — | A part of graphite powder was agglomerated | No redox wave was observed |

*Added amount of polyethylene glycols relative to 100 parts by weight of radical polymers

INDUSTRIAL APPLICABILITY

The present invention provides a radical composition capable of suppressing elution of electrode components in an electrolyte solution when used in an electrode for a secondary battery, and a battery using the radical composition.

REFERENCE SIGNS LIST

1. Stainless steel covering
2. Insulating packing
3. Anode
4. Separator
5. Cathode
6. Cathode current collector

The invention claimed is:

1. A radical composition comprising:
   a pyrroline nitroxide polymer; and
   polyethylene glycols, the amount of the polyethylene glycol being 0.5 to 10 parts by mass relative to 100 parts by mass of the pyrroline nitroxide polymer,
   the polyethylene glycols having a number average molecular weight in a range from 500 Daltons to 400,000 Daltons; wherein the pyrroline nitroxide polymer is obtained by polymerization of a pyrroline nitroxide compound represented by formula (1) or formula (2):

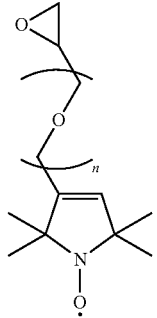

(1)

wherein n represents 0 or 1

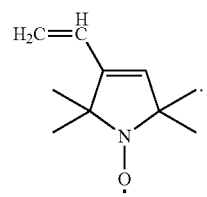

(2)

2. A battery comprising the radical composition according to claim 1.

* * * * *